(12) United States Patent
Fu et al.

(10) Patent No.: US 9,560,487 B2
(45) Date of Patent: Jan. 31, 2017

(54) METHOD AND APPARATUS FOR WIRELESS LOCATION TRACKING

(75) Inventors: Jin Fu, Shanghai (CN); Rongzhen Yang, Shanghai (CN); Hujun Yin, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 10 days.

(21) Appl. No.: 13/976,939

(22) PCT Filed: Dec. 23, 2011

(86) PCT No.: PCT/CN2011/002170
§ 371 (c)(1),
(2), (4) Date: Jun. 27, 2013

(87) PCT Pub. No.: WO2013/091147
PCT Pub. Date: Jun. 27, 2013

(65) Prior Publication Data
US 2013/0288713 A1    Oct. 31, 2013

(51) Int. Cl.
*H04W 64/00* (2009.01)
*H04W 4/02* (2009.01)
(Continued)

(52) U.S. Cl.
CPC ............ *H04W 4/025* (2013.01); *G01S 5/0252* (2013.01); *H04W 64/00* (2013.01); *H04W 4/028* (2013.01); *H04W 4/043* (2013.01)

(58) Field of Classification Search
CPC ............ G01S 5/0252; G01S 1/00; G01S 5/00; H04W 4/025; H04W 4/043; H04W 4/028; H04W 4/02; H04W 64/00; H04W 8/06; H04W 4/023; H04W 4/04; H04W 84/045; H04W 84/105; H04W 64/003; H04W 64/006; H04W 4/021; H04B 7/18556
(Continued)

(56) References Cited

U.S. PATENT DOCUMENTS 7,933,612 B2 * 4/2011 Counts et al. ................ 455/457
8,369,264 B2 * 2/2013 Brachet ................ G01S 5/0236
370/328
(Continued)

FOREIGN PATENT DOCUMENTS

CN        1906895        1/2007
WO   WO-2010115722   10/2010

OTHER PUBLICATIONS

International Search Report and Written Opinion for PCT Patent Application No. PCT/CN2011/002170 Mailed Oct. 4, 2012, 10 Pages.

*Primary Examiner* — Meless Zewdu
(74) *Attorney, Agent, or Firm* — SLGIP

(57) ABSTRACT

A method and apparatus for wireless location tracking by a wireless device. In one embodiment of the invention, the wireless device has logic to determine the information of a plurality of specific location points and to determine the location of the wireless device based on the information of the plurality of specific location points. The specific location points are selected from a target area where the wireless device is located. By selecting the specific location points in the target area, it allows hidden Access Points (APs) or Base Stations (BSs) to be detected and measured and it increases the accuracy of the tracking of the wireless device.

20 Claims, 4 Drawing Sheets

(51) Int. Cl.
*G01S 5/02* (2010.01)
*H04W 4/04* (2009.01)

(58) Field of Classification Search
USPC .................. 455/41.2, 66.1, 67.11, 67.16,
404.2,455/422.1, 423–425, 434,
456.1–456.6, 57, 500,455/513, 517, 524,
550.1, 552.1, 556.2, 561
See application file for complete search history.

(56) References Cited

U.S. PATENT DOCUMENTS

| | | | | |
|---|---|---|---|---|
| 8,618,984 | B2* | 12/2013 | Lin ........................ | G01S 5/02 342/451 |
| 8,933,841 | B2* | 1/2015 | Valaee ................. | H04W 64/00 342/451 |
| 8,971,915 | B2* | 3/2015 | Alizadeh-Shabdiz | G01S 5/0278 455/418 |
| 2002/0164996 | A1* | 11/2002 | Dorenbosch ................ | 455/456 |
| 2003/0154040 | A1* | 8/2003 | Nann et al. ................... | 702/63 |
| 2004/0203904 | A1* | 10/2004 | Gwon et al. ............. | 455/456.1 |
| 2005/0135319 | A1* | 6/2005 | Shi et al. ..................... | 370/338 |
| 2005/0195761 | A1* | 9/2005 | Alicherry ............. | G01S 5/0289 370/328 |
| 2006/0073788 | A1 | 4/2006 | Halkka et al. | |
| 2007/0060170 | A1* | 3/2007 | Fukui ...................... | 455/456.1 |
| 2009/0319180 | A1* | 12/2009 | Robinson et al. ......... | 701/208 |
| 2011/0034179 | A1* | 2/2011 | David ................. | G01S 5/0236 455/456.1 |
| 2012/0021759 | A1* | 1/2012 | Chen et al. .............. | 455/456.1 |
| 2012/0058778 | A1* | 3/2012 | Waters et al. ............ | 455/456.1 |

\* cited by examiner

```
410 XML database

<?xmlversion="1.0"encoding="UTF-8"?>
<hostBssid>00-1D-E0-23-B4-C1</hostBssid>
<Location>
        <Latitude>31.024521601254506</Latitude>
        <Longitude>121.450499188137<Longitude>
        <Altitude>-</Altitude>
</Location>
<WirelessEnvironmentInfo>
        <point>
                <macAddress>00-24-50-13-b3-62</macAddress>
                <vendor>-</vendor>
                <ssid>Guest</ssid>
                <channel>6</channel>
                <rssi>-52</rssi>
                <firstSeen>20100915152343</firstSeen>
                <lastDetected>20100915164158</lastDetected>
        </point>
        <point>
                <macAddress>00-24-50-13-b1-f1</macAddress>
                <vendor>-</vendor>
                <ssid>TSNOfficeWLAN</ssid>
                <channel>3</channel>
                <rssi>-58</rssi>
                <firstSeen>20100915152343</firstSeen>
                <lastDetected>20100915164158</lastDetected>
        </point>
                .................
</WirelessEnvironmentInfo>
```

400          FIG. 4

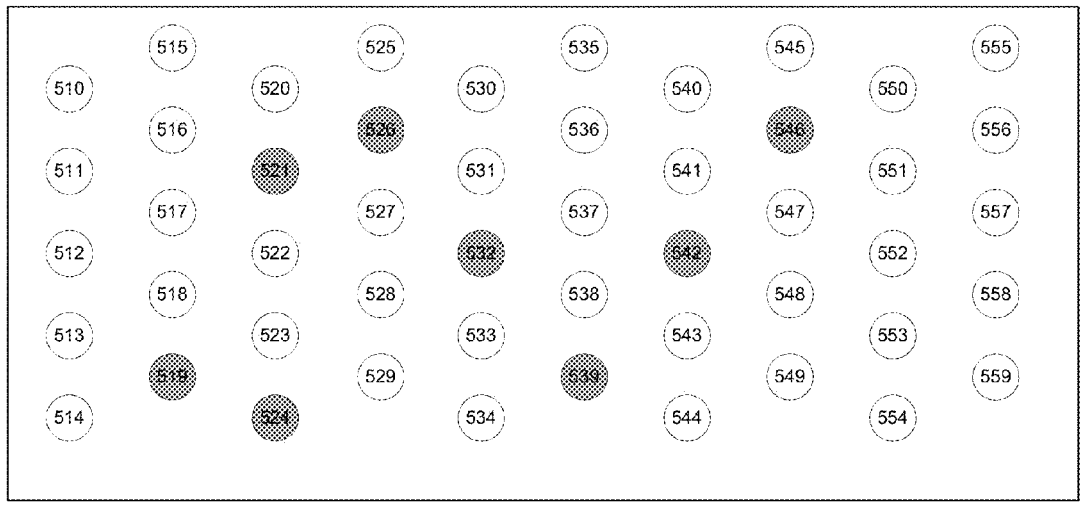
500   FIG. 5
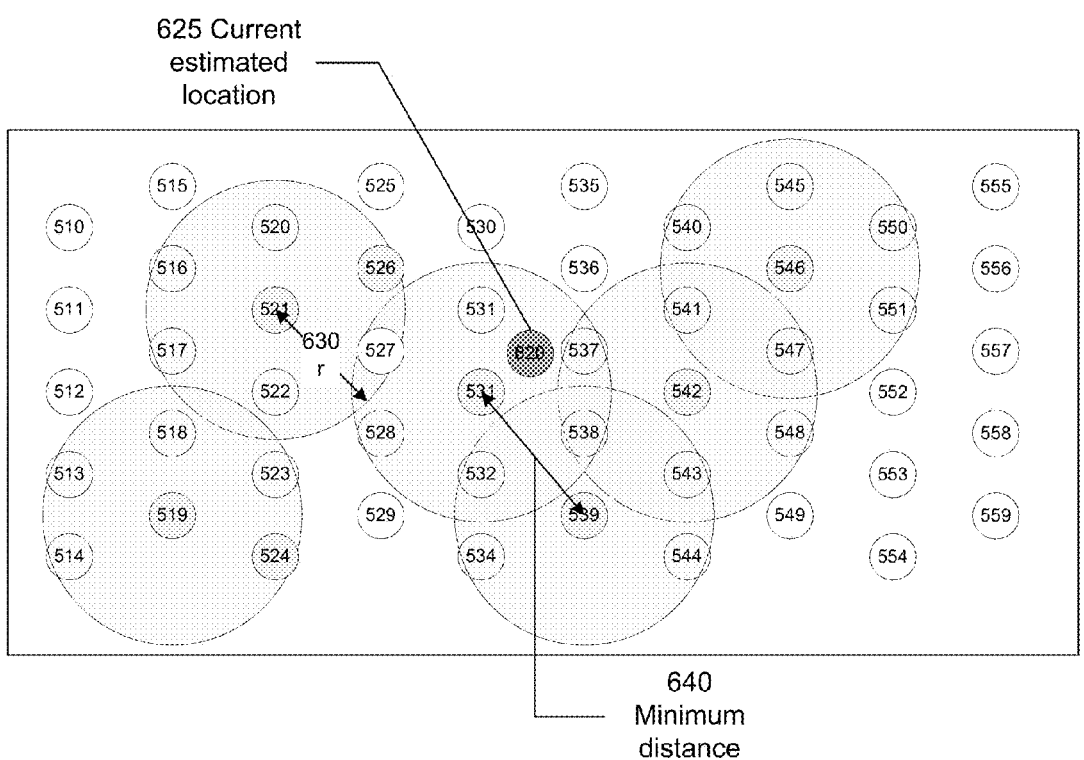
600   FIG. 6

METHOD AND APPARATUS FOR WIRELESS LOCATION TRACKING

CLAIM OF PRIORITY

This application is a U.S. National Phase application under 35 U.S.C. §371 of International Application No. PCT/CN2011/002170, filed Dec. 23, 2011, entitled "METHOD AND APPARATUS FOR WIRELESS LOCATION TRACKING," the entire contents of which are incorporated herein by reference.

FIELD OF THE INVENTION

This invention relates to a wireless device, and more specifically but not exclusively, to a method and apparatus for wireless location tracking by the wireless device.

BACKGROUND DESCRIPTION

With a wide spread use of Global Positioning System (GPS), the location of a target with a GPS receiver in an open area can be easily be traced. However, when the target is in an urban area surrounded by tall buildings, the GPS receiver is unable to provide an accurate estimation of the location of the target as the GPS signals are weakened or blocked.

In an indoor situation, the GPS signals are attenuated and the location of the target cannot be tracked using the GPS receiver. This poses a problem for users who want to track a target in an indoor situation such as an office building, car park etc. There is no indoor tracking or positioning system that allows high accuracy of tracking a target.

BRIEF DESCRIPTION OF THE DRAWINGS

The features and advantages of embodiments of the invention will become apparent from the following detailed description of the subject matter in which:

FIG. 4 illustrates a Extensible Markup Language (XML) database in accordance with one embodiment of the invention;

FIG. 5 illustrates the identification of specific points with the highest relative degree values in accordance with one embodiment of the invention;

FIG. 6 illustrates the estimation of the location of the target device using weight circles in accordance with one embodiment of the invention.

DETAILED DESCRIPTION

Figure 1:
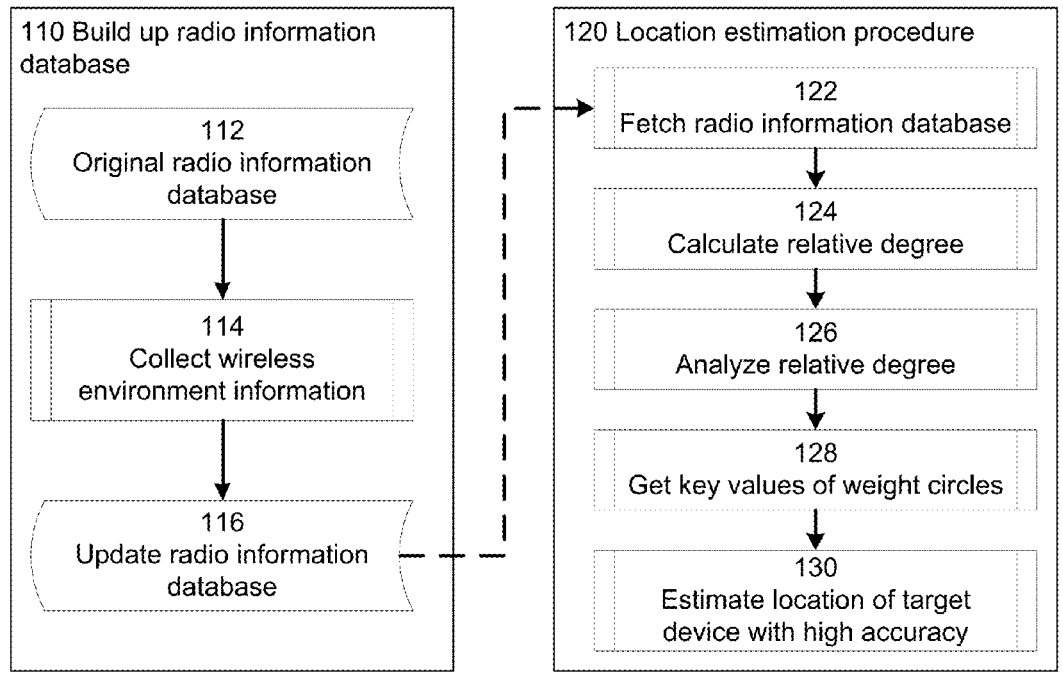
FIG. 1 illustrates a flow chart of the operations to track a target device in accordance with one embodiment of the invention.

Embodiments of the invention described herein are illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference numerals have been repeated among the figures to indicate corresponding or analogous elements. Reference in the specification to "one embodiment" or "an embodiment" of the invention means that a particular feature, structure, or characteristic described in connection with the embodiment is included in at least one embodiment of the invention. Thus, the appearances of the phrase "in one embodiment" in various places throughout the specification are not necessarily all referring to the same embodiment.

Embodiments of the invention provide a method and apparatus for wireless location tracking by a wireless device. In one embodiment of the invention, the wireless device has logic to determine the information of a plurality of specific location points and to determine its location based on the information of the plurality of specific location points.

In one embodiment of the invention, the specific location points are selected from a target area where the wireless device is located. By selecting the specific location points in the target area, it allows hidden Access Points (APs) or Base Stations (BSs) to be detected and measured and it increases the accuracy of the tracking of the wireless device in one embodiment of the invention.

Further, the wireless device does not need to build a database of the exact location of each AP or BS in the environment or target area to determine its location in one embodiment of the invention. The wireless device can rely on the specific location points selected from the target area to determine its location in one embodiment of the invention. This allows the cost to be reduced as there is no need to build the database of each AP or BS in the environment or target area in one embodiment of the invention.

In one embodiment of the invention, the wireless device is capable of homogeneous wireless communication and/or heterogeneous wireless communication by accessing a plurality of wireless networks and/or wired networks. In one embodiment of the invention, the wireless device includes, but is not limited to, a wireless electronic device such as a desktop computer, a laptop computer, a handheld computer, a tablet computer, a cellular telephone, a pager, an audio and/or video player (e.g., an MP3 player or a DVD player), a gaming device, a video camera, a digital camera, a navigation device (e.g., a GPS device), a wireless peripheral (e.g., a printer, a scanner, a headset, a keyboard, a mouse, etc.), a medical device (e.g., a heart rate monitor, a blood pressure monitor, etc.), digital audio speakers for enhanced audio, gaming devices, and/or other suitable fixed, portable, or mobile electronic devices.

The wireless device uses a modulation technique, including but not limited to, spread spectrum modulation (e.g., direct sequence code division multiple access (DS-CDMA) and/or frequency hopping code division multiple access (FH-CDMA)), time-division multiplexing (TDM) modulation, frequency-division multiplexing (FDM) modulation, orthogonal frequency-division multiplexing (OFDM) modulation, orthogonal frequency-division multiple access (OFDMA), multi-carrier modulation (MDM), and/or other suitable modulation techniques to communicate via wireless communication links.

In one embodiment of the invention, the wireless device communicates at least in part in accordance with communication standards such as, but are not limited to, Institute of Electrical and Electronic Engineers (IEEE) 802.11(a), 802.11(b), 802.11(g), 802.11(h), 802.11(j), 802.11(n), 802.16-2004, 802.16(e), 802.16(m) and their variations and evolutions thereof standards, and/or proposed specifications, Home Plug AV (HPAV), Ultra Wide Band (UWB), Bluetooth, or any form of wireless communication protocol, although the scope of the invention is not limited in this respect as they may also be suitable to transmit and/or receive communications in accordance with other techniques and standards.

For more information with respect to the IEEE 802.11 and IEEE 802.16 standards, please refer to "IEEE Standards for Information Technology—Telecommunications and Information Exchange between Systems"—Local Area Networks—Specific Requirements—Part 11 "Wireless LAN Medium Access Control (MAC) and Physical Layer (PHY), ISO/IEC 8802-11: 1999", and Metropolitan Area Networks—Specific Requirements—Part 16: "Air Interface for Fixed Broadband Wireless Access Systems," May 2005 and related amendments/versions.

FIG. 1 illustrates a flow chart 100 of the operations to track a wireless device in accordance with one embodiment of the invention. The flow chart 100 illustrates an operation 110 to build up a radio information database and a location estimation procedure 120 in one embodiment of the invention.

In step 114, the wireless environment information is collected from the original radio information database 112. In step 116, the radio information database is updated from the collected wireless environment information. In one embodiment of the invention, the wireless environment information is collected manually from a number of pre-determined or specified points or spots in the target area. The pre-determined points are selected such that they allow the wireless device to detect its location with high accuracy in one embodiment of the invention.

Figure 2:
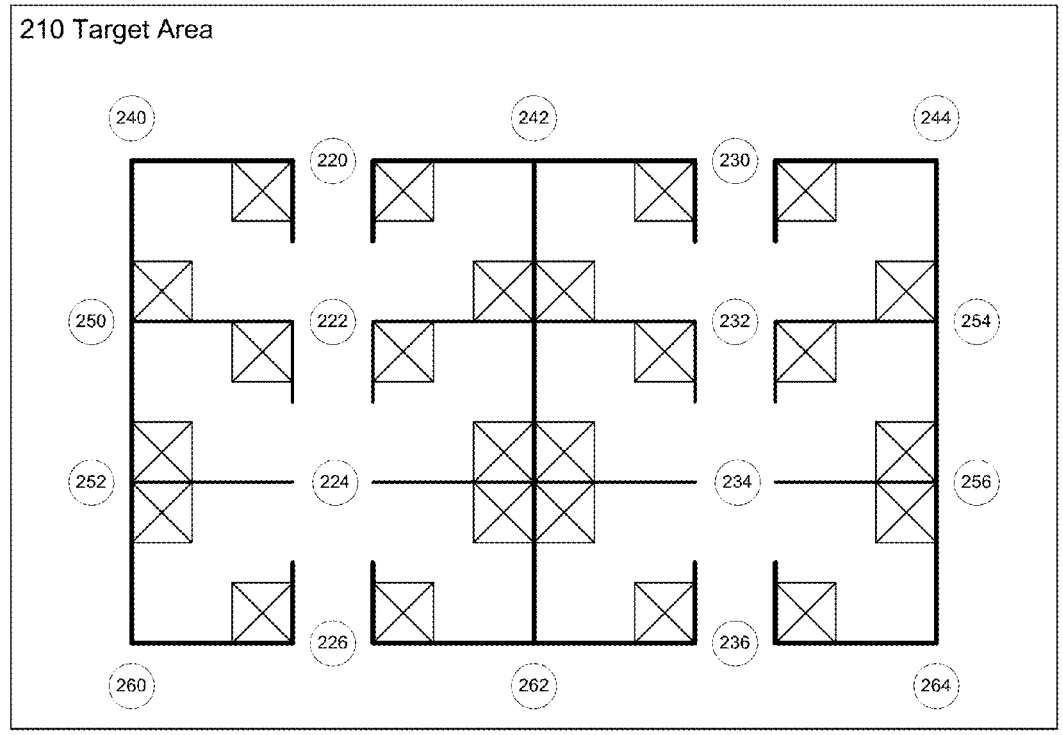
FIG. 2 illustrates a layout of a target area in accordance with one embodiment of the invention.

For example, FIG. 2 illustrates a layout 200 of a target area 210 in accordance with one embodiment of the invention. The target area 210 is the region or area where the wireless device is located in one embodiment of the invention. For clarity of illustration, the target area 210 shows an indoor office layout in one embodiment of the invention. The points 220, 222, 224, 226, 230, 232, 234, 236, 240, 242, 244, 250, 252, 254, 256, 260, 262, and 264 illustrate the pre-determined points that allow the wireless device to detect its location with high accuracy in one embodiment of the invention. The points 220, 222, 224, 226, 230, 232, 234, 236 are selected from the aisles of the cubicles of the target area 210 and the points 240, 242, 244, 250, 252, 254, 256, 260, 262, and 264 are selected from the perimeter of the cubicles of the target area 210 in one embodiment of the invention.

In another embodiment of the invention, the wireless environment information is collected automatically by the wireless clients or stations that already know their exact location. For example, in one embodiment of the invention, a wireless client equipped with a wireless location tracking module such as a GPS module can submit their current location details to the radio information database. This allows the radio information database to be updated automatically when the wireless clients submit information of their location in one embodiment of the invention.

When the radio information database has been updated, the wireless device(s) in the target area 210 uses the location estimation procedure 120 to estimate its current location. In step 122, the wireless device fetches information from the radio information database. Using the retrieved information from the radio information database, the wireless device determines or calculates the relative degree of the points in the radio information database with respect to its current location in step 124.

In step 126, the wireless device analyzes the calculated relative degrees and obtains the key values of the weight circles in step 128. In step 130, the wireless device uses the key values of the weight circles to estimate its location with high accuracy in one embodiment of the invention.

The target area 210 shown in FIG. 2 is not meant to be limiting. The target area includes, but not limited to, office, gymnasium, shopping malls, parking garages and any other indoor areas. One of ordinary skill in the relevant will readily appreciate how to select the points in the target area such that they allow the wireless device to detect its location with high accuracy and shall not be described herein.

Figure 3:
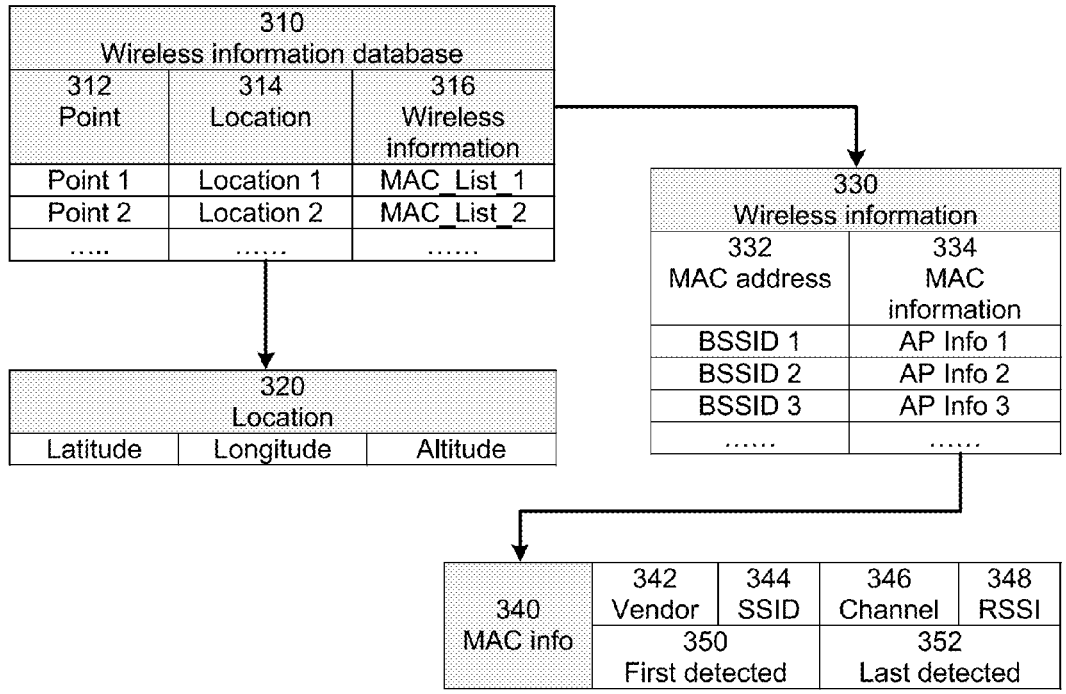
FIG. 3 illustrates a wireless information database in accordance with one embodiment of the invention.

FIG. 3 illustrates a wireless information database 310 in accordance with one embodiment of the invention. For clarity of illustration, FIG. 3 is discussed with reference to FIG. 2. In one embodiment of the invention, the wireless information database 310 stores information of the pre-determined or specific points in the target area 210. In one embodiment of the invention, the wireless information database 310 has three parameters: the point field 312, the location field 314, and the wireless information field 316. The points 1 and 2 illustrate two points stored in the wireless information database 310.

In one embodiment of the invention, the location field 314 stores the latitude, longitude and altitude of each point. The wireless information field 316 comprises the Media Access Control (MAC) address 332 and the MAC information 334 in one embodiment of the invention. The basic service set identifiers (BSSIDs) 1, 2 and 3 and the associated access point information (AP info 1, 2, and 3) illustrate three sets of data in the wireless information field 316. For each MAC information 334, the wireless information database 310 stores the vendor identification 342, a service set identifier (SSID) 344, a channel number 346, a received signal strength indicator (RSSI) 348, a first time of first detection 350, and a second time of last detection 352.

The wireless information database 310 illustrated in FIG. 3 is not meant to be limiting and more or less information may be stored in the wireless information database 310 in other embodiments of the invention.

FIG. 4 illustrates an Extensible Markup Language (XML) database 410 in accordance with one embodiment of the invention. For clarity of illustration, FIG. 4 is discussed with reference to FIGS. 1, 2 and 3. The XML database 410 illustrates the wireless information database 310 of the pre-determined points in the target area 210 in one embodiment of the invention. The XML database 410 illustrates two points that have the information as illustrated in FIG. 3.

One of ordinary skill in the relevant art will readily appreciate how the XML database 410 is listed and shall not be described herein. The illustration of the wireless information database 310 in the XML format is not meant to be limiting and other database formats can be used to create the wireless information database 310 in another embodiment of the invention.

FIG. 5 illustrates the identification of specific points with the highest relative degree values in accordance with one embodiment of the invention. For clarity of illustration, FIG. 5 is discussed with reference to FIG. 1. The points 510 to 559 illustrate the specific points in a target area in one embodiment of the invention. The points 519, 521, 524, 525, 532, 539, 542 and 546 illustrate the specific points that have the highest relative degree in one embodiment of the invention. In one embodiment of the invention, step 126 of the location estimation procedure determines the points 519, 521, 524, 525, 532, 539, 542 and 546.

In one embodiment of the invention, to determine the relative degree, the wireless information database is defined as follows: One collected specific point P(x) from a Wi-Fi client can be expressed as a set of $\{(M_i, R(P(x), M_i))\}$, where $i=1{\sim}N$ (from 1 to N). $M_i$ refers to the MAC address of the $i^{th}$ AP in the location point $P(x)$ and $R(P(x), M_1)$ is the corresponding Received Signal Strength (RSS) measured value of $i^{th}$ AP at the location point $P(x)$.

The matching relative degree value of two points $P(x)$ and $P(y)$ can be defined as:

$$RelativeDegree(P(x), P(y)) =$$
$$\sum_{i=1}^{n} Normfactor_i \times N(R(P(x), M_i) - R(P(y), M_i), \sigma^2) =$$
$$\sum_{i=1}^{n} Normfactor_i \times \frac{1}{\sqrt{2\pi}\sigma} e^{-\frac{(R(P(x),M_i)-R(P(y),M_i))^2}{2\sigma^2}}$$

The $Normfactor_i$ is defined as:

$$Normfactor_i = \frac{1}{\sqrt{2\pi}\sigma} e^{-\frac{(R(P(x),M_i)-RssiMax)^2}{2\sigma^2}}$$

rssiMax is the observed RSS mean value at zero-distance (in dBm units) which can be pre-set as −50 in one embodiment of the invention. δ is the Wi-Fi radio feature parameter which can be pre-set as 20 in one embodiment of the invention. The key control parameter, σ, needs to be derived by the data in wireless information database as for each collected point, the σ is different for each AP (identified by different MAC address $M_i$) in one embodiment of the invention.

σ is expressed and derived as equation $$\sigma(P(x), M_i) = \frac{1}{\frac{1}{N_{M_i}} \sum_{j=1}^{N_{M_i}} \frac{|R(P(x), M_i) - R(P(z_j), M_i)|}{Distance(P(x), P(z_j))}}$$

$R(P(x), M_i)$ is the RSS measured value of MAC address $M_i$ AP in the location point $P(x)$ and $R(P(z_j), M_i)$ is the RSS measured value of MAC address $M_i$ AP in the location point $P(z_j)$. $N_{Mi}$ is the number of nearby collected points (nearby of $P(x)$), that is expressed as $P(z_j)$ and the judgment of "nearby" is decided by the distance threshold D. One of ordinary skill in the relevant art will readily how the relative degree is obtained and shall not be described herein.

FIG. 6 illustrates the estimation of the location of the target device using weight circles in accordance with one embodiment of the invention. For clarity of illustration, FIG. 6 is discussed with reference to FIG. 5. In one embodiment of the invention, after the relative degree values have been determined, a selection of the points with the highest relative degree values is made by the wireless device. The points 519, 521, 524, 525, 532, 539, 542 and 546 illustrate the specific points that have the highest relative degree in one embodiment of the invention.

In one embodiment of the invention, a weight circle is drawn for each point among the group of points 519, 521, 524, 525, 532, 539, 542 and 546 based on one or more rules or parameters. The radius r 630 illustrates the radius of the weight circle for the point 514 in one embodiment of the invention.

The one or more rules include, but are not limited to, a rule that a point can be added repeatedly in different circles as long as its distances from different top points are less than the radius r, a rule that the center of the weight circle is one of the top-value points, a rule that the relative degree of all points in a particular weight circle are added or accumulated, and a rule that if the distance between two top-value points is not more than a minimum distance, only one circle will be drawn to include them and the center of circle is the top value between or among those points.

The following equation illustrate how to accumulate or add the relative degree values in the weight circle:

$$weight_k = \Sigma_{i=1}^{N} RelativeDegree_i$$

The main intention of this step is to reduce the deviation of measurement for real radio environment in one embodiment of the invention. Using the rules described earlier, the weight circles for the points 519, 521, 524, 525, 532, 539, 542 and 546 are illustrated in FIG. 6 with each point being the center of the respective weight circle. The weight circle for the point 524 is not drawn as the distance between the point 519 and its closest point 524 is less than the minimum distance 640. Similarly, the weight circle for the point 528 is not drawn as the distance between the point 528 and its closest point 521 is less than the minimum distance 640.

In one embodiment of the invention, when the weight circles have been determined, the location of the wireless device is calculated using the following equation:

$$location = \sum_{k=1}^{N} \frac{location_k \times weight_k}{weight\_sum}$$

The weight_sum is determined from this equation:

$$weight\_sum = \Sigma_{k=1}^{N} weight_k,$$

The $location_k$ is the center of $k^{th}$ circle and the point 620 illustrates the current estimated location of the wireless device. The weight circles illustrated in FIG. 6 are not meant to be limiting. In another embodiment of the invention, three dimensional weight circles can be used to determine the location of a wireless device that is situated on a different floor. One of ordinary skill in the relevant will readily appreciate how to extend the two dimensional weight circles to three dimensional weight circles to determine the location of the wireless device and shall not be described herein.

Figure 7:
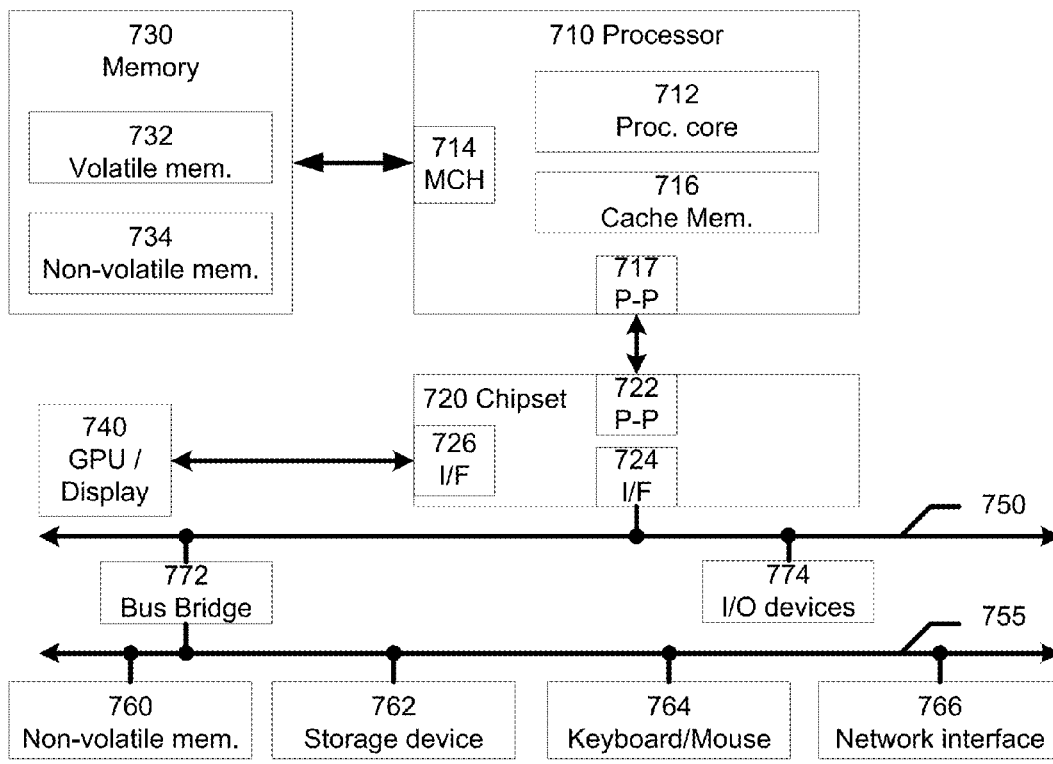
FIG. 7 illustrates a system to implement the methods disclosed herein in accordance with one embodiment of the invention.

FIG. 7 illustrates a system 700 to implement the methods disclosed herein in accordance with one embodiment of the invention. The system 700 illustrates a wireless device in one embodiment of the invention. The system 700 includes, but is not limited to, a desktop computer, a laptop computer, a net book, a notebook computer, a personal digital assistant (PDA), a server, a workstation, a cellular telephone, a mobile computing device, an Internet appliance or any other type of computing device. In another embodiment, the system 700 used to implement the methods disclosed herein may be a system on a chip (SOC) system.

The processor 710 has a processing core 712 to execute instructions of the system 700. The processing core 712 includes, but is not limited to, pre-fetch logic to fetch instructions, decode logic to decode the instructions, execution logic to execute instructions and the like. The processor 710 has a cache memory 716 to cache instructions and/or data of the system 700. In another embodiment of the invention, the cache memory 716 includes, but is not limited to, level one, level two and level three, cache memory or any other configuration of the cache memory within the processor 710.

The memory control hub (MCH) 714 performs functions that enable the processor 710 to access and communicate with a memory 730 that includes a volatile memory 732 and/or a non-volatile memory 734. The volatile memory 732 includes, but is not limited to, Synchronous Dynamic Random Access Memory (SDRAM), Dynamic Random Access Memory (DRAM), RAMBUS Dynamic Random Access Memory (RDRAM), and/or any other type of random access memory device. The non-volatile memory 734 includes, but is not limited to, NAND flash memory, phase change memory (PCM), read only memory (ROM), electrically erasable programmable read only memory (EEPROM), or any other type of non-volatile memory device.

The memory 730 stores information and instructions to be executed by the processor 710. The memory 730 may also stores temporary variables or other intermediate information while the processor 710 is executing instructions. The chipset 720 connects with the processor 710 via Point-to-Point (PtP) interfaces 717 and 722. The chipset 720 enables the processor 710 to connect to other modules in the system 700. In one embodiment of the invention, the interfaces 717 and 722 operate in accordance with a PtP communication protocol such as the Intel® QuickPath Interconnect (QPI) or the like. The chipset 720 connects to a display device 740 that includes, but is not limited to, liquid crystal display (LCD), cathode ray tube (CRT) display, or any other form of visual display device.

In addition, the chipset 720 connects to one or more buses 750 and 755 that interconnect the various modules 774, 760, 762, 764, and 766. Buses 750 and 755 may be interconnected together via a bus bridge 772 if there is a mismatch in bus speed or communication protocol. The chipset 720 couples with, but is not limited to, a non-volatile memory 760, a mass storage device(s) 762, a keyboard/mouse 764 and a network interface 766. The mass storage device 762 includes, but is not limited to, a solid state drive, a hard disk drive, an universal serial bus flash memory drive, or any other form of computer data storage medium. The network interface 766 is implemented using any type of well known network interface standard including, but not limited to, an Ethernet interface, a universal serial bus (USB) interface, a Peripheral Component Interconnect (PCI) Express interface, a wireless interface and/or any other suitable type of interface. The wireless interface operates in accordance with, but is not limited to, the IEEE 802.11 standard and its related family, Home Plug AV (HPAV), Ultra Wide Band (UWB), Bluetooth, WiMax, or any form of wireless communication protocol.

While the modules shown in FIG. 7 are depicted as separate blocks within the system 700, the functions performed by some of these blocks may be integrated within a single semiconductor circuit or may be implemented using two or more separate integrated circuits. For example, although the cache memory 716 is depicted as a separate block within the processor 710, the cache memory 716 can be incorporated into the processor core 712 respectively. The system 700 may include more than one processor/processing core in another embodiment of the invention.

The methods disclosed herein can be implemented in hardware, software, firmware, or any other combination thereof. Although examples of the embodiments of the disclosed subject matter are described, one of ordinary skill in the relevant art will readily appreciate that many other methods of implementing the disclosed subject matter may alternatively be used. In the preceding description, various aspects of the disclosed subject matter have been described. For purposes of explanation, specific numbers, systems and configurations were set forth in order to provide a thorough understanding of the subject matter. However, it is apparent to one skilled in the relevant art having the benefit of this disclosure that the subject matter may be practiced without the specific details. In other instances, well-known features, components, or modules were omitted, simplified, combined, or split in order not to obscure the disclosed subject matter.

The term "is operable" used herein means that the device, system, protocol etc, is able to operate or is adapted to operate for its desired functionality when the device or system is in off-powered state. Various embodiments of the disclosed subject matter may be implemented in hardware, firmware, software, or combination thereof, and may be described by reference to or in conjunction with program code, such as instructions, functions, procedures, data structures, logic, application programs, design representations or formats for simulation, emulation, and fabrication of a design, which when accessed by a machine results in the machine performing tasks, defining abstract data types or low-level hardware contexts, or producing a result.

The techniques shown in the figures can be implemented using code and data stored and executed on one or more computing devices such as general purpose computers or computing devices. Such computing devices store and communicate (internally and with other computing devices over a network) code and data using machine-readable media, such as machine readable storage media (e.g., magnetic disks; optical disks; random access memory; read only memory; flash memory devices; phase-change memory) and machine readable communication media (e.g., electrical, optical, acoustical or other form of propagated signals—such as carrier waves, infrared signals, digital signals, etc.).

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter.

What is claimed is:

1. A method comprising:
   determining information of a plurality of specific location points; and
   determining a location of a wireless device based on the information of the plurality of specific location points by:
      determining a plurality of relative degree values for each of the plurality of specific location points with respect to the location of the wireless device; and
      determining a subset of specific location points from the plurality of specific location points, wherein each specific location point in the subset of specific location points has a relative degree value higher or equal to the other specific location points that are not in the subset of specific location points;
   wherein determining the location of the wireless device based on the information of the plurality of specific location points further comprises:
   determining a plurality of weight circles for each specific location point of the subset of specific location points;
   for each of the weight circles, accumulating the relative degree values of each of the subset of specific location points within the weight circle; and determining the location of the wireless device based at least on the accumulated relative degree values of the each of the subset of specific location point for each weight circle.

2. The method of claim 1, further comprising: storing the information of the plurality of the specific location points into a database.

3. The method of claim 1, wherein the database comprises an Extensible Markup Language (XML) database.

4. The method of claim 1, wherein the information of the plurality of the specific location points comprises one or more of, a latitude, a longitude, an altitude, and wireless information, of each of the plurality of the specific location points.

5. The method of claim 4, wherein the wireless information of each of the plurality of the specific location points comprises one or more of, a Media Access Control (MAC) address, a vendor identification, a service set identifier (SSID), a channel number, a received signal strength indicator (RSSI), a first time of first detection, a second time of last detection, of each of the plurality of the specific location points.

6. The method of claim 1, wherein the wireless device is operable at least in part with one of Institute of Electrical and Electronics Engineers (IEEE) 802.11 standard, a IEEE 802.16m standard, a 3rd Generation Partnership Project (3GPP) Long Term Evolution standard, a Bluetooth standard, and an ultra wideband standard.

7. A computer-readable medium having non-transitory instructions stored thereon executable on a processor, the computer-readable medium comprising:
logic to:
obtain information of a plurality of specific location points; and
determine a location of an apparatus based on the information of the plurality of specific location points by further executing steps to:
determine a plurality of relative degree values for each of the plurality of specific location points with respect to the location of the apparatus; and
determine a subset of specific location points from the plurality of specific location points, wherein each specific location point in the subset of specific location points has a relative degree value higher or equal to the other specific location points that are not in the subset of specific location points;
wherein the logic to determine the plurality of relative degree values for each of the plurality of specific location points with respect to the location of the apparatus is to determine a key control parameter for each of the plurality of specific location points based on a Received Signal Strength (RSS) of each Access Point (AP) associated with each of the plurality of specific location points; and
wherein the logic to determine the plurality of relative degree values for each of the plurality of specific location points with respect to the location of the apparatus is to determine the plurality of relative degree values for each of the plurality of specific location points with respect to the location of the apparatus based on a normalization factor and the key control parameter for each of the plurality of specific location points.

8. The computer-readable medium of claim 7, wherein the information of the plurality of the specific location points comprises one or more of, a latitude, a longitude, an altitude, and wireless information, of each of the plurality of the specific location points.

9. The computer-readable medium of claim 7, wherein the wireless information of each of the plurality of the specific location points comprises one or more of, a Media Access Control (MAC) address, a vendor identification, a service set identifier (SSID), a channel number, a received signal strength indicator (RSSI), a first time of first detection, a second time of last detection, of each of the plurality of the specific location points.

10. The computer-readable medium of claim 7, wherein the information of the plurality of the specific location points are stored in an Extensible Markup Language (XML) database.

11. The computer-readable medium of claim 7, wherein the apparatus is operable at least in part with one of Institute of Electrical and Electronics Engineers (IEEE) 802.11 standard, a IEEE 802.16m standard, a 3rd Generation Partnership Project (3GPP) Long Term Evolution standard, a Bluetooth standard, and an ultra wideband standard.

12. A computer-readable medium having non-transitory instructions stored thereon executable on a processor, the computer-readable medium comprising logic to:
obtain information of a plurality of specific location points; and
determine a location of an apparatus based on the information of the plurality of specific location points by further executing steps to
determine a plurality of relative degree values for each of the plurality of specific location points with respect to the location of the apparatus; and
determine a subset of specific location points from the plurality of specific location points, wherein each specific location point in the subset of specific location points has a relative degree value higher or equal to the other specific location points that are not in the subset of specific location points;
wherein the logic to determine the location of the apparatus based on the information of the plurality of specific location points is further to:
determine a plurality of weight circles for each specific location point of the subset of specific location points;
for each weight circle, accumulate the relative degree values of each specific location point within the weight circle; and
determine the location of the wireless device based at least on the accumulated relative degree values of each specific location point for each weight circle.

13. The computer-readable medium of claim 12, wherein the logic to determine the plurality of weight circles for each specific location point of the subset of specific location points is to:
determine the plurality of weight circles for each specific location point of the subset of specific location points based on a rule that if two specific location points of the subset of specific location points are less than a minimum distance, only one weight circle is determined for one of the two specific location points that has a higher relative degree value.

14. A system comprising:
a computer-readable medium having non-transitory instructions stored thereon executable on a processor, the computer-readable medium having a memory module;
logic coupled with the memory module to:

obtain information of a plurality of specific location points; and determine a location of a mobile device based on the information of the plurality of specific location points by further executing steps to:

determine a plurality of relative degree values for each of the plurality of specific location points with respect to the location of the mobile device; and determine a subset of specific location points from the plurality of specific location points, wherein each specific location point in the subset of specific location points has a relative degree value higher or equal to the other specific location points that are not in the subset of specific location points;

wherein the logic to determine the plurality of relative degree values for each of the plurality of specific location points with respect to the location of the system is to determine a key control parameter for each of the plurality of specific location points based on a Received Signal Strength (RSS) of each Access Point (AP) associated with each of the plurality of specific location points; and wherein the logic to determine the plurality of relative degree values for each of the plurality of specific location points with respect to the location of the system is to determine the plurality of relative degree values for each of the plurality of specific location points with respect to the location of the system based on a normalization factor and the key control parameter for each of the plurality of specific location points.

15. The system of claim 14, wherein the information of the plurality of the specific location points comprises one or more of, a latitude, a longitude, an altitude, and wireless information, of each of the plurality of the specific location points.

16. The system of claim 14, wherein the wireless information of each of the plurality of the specific location points comprises one or more of, a Media Access Control (MAC) address, a vendor identification, a service set identifier (SSID), a channel number, a received signal strength indicator (RSSI), a first time of first detection, a second time of last detection, of each of the plurality of the specific location points.

17. The system of claim 14, wherein the information of the plurality of the specific location points are stored in an Extensible Markup Language (XML) database.

18. The system of claim 14, wherein the apparatus is operable at least in part with one of Institute of Electrical and Electronics Engineers (IEEE) 802.11 standard, a IEEE 802.16m standard, a 3rd Generation Partnership Project (3GPP) Long Term Evolution standard, a Bluetooth standard, and an ultra wideband standard.

19. A system comprising:

a computer-readable medium having non-transitory instructions stored thereon executable on a processor, the computer-readable medium having a memory module;

logic coupled with the memory module to:

obtain information of a plurality of specific location points; and determine a location of a wireless device based on the information of the plurality of specific location points, wherein the logic to determine the location of the system based on the information of the plurality of specific location points is further to:

determine a plurality of weight circles for each specific location point of the subset of specific location points;

for each weight circle, accumulate the relative degree values of each specific location point within the weight circle; and determine the location of the wireless device based at least on the accumulated relative degree values of each specific location point for each weight circle.

20. The system of claim 19, wherein the logic to determine the plurality of weight circles for each specific location point of the subset of specific location points is to:

determine the plurality of weight circles for each specific location point of the subset of specific location points based on a rule that if two specific location points of the subset of specific location points are less than a minimum distance, only one weight circle is determined for one of the two specific location points that has a higher relative degree value.

* * * * *